(12) United States Patent
Lin et al.

(10) Patent No.: US 9,576,084 B2
(45) Date of Patent: Feb. 21, 2017

(54) GENERATING A SMOOTH GRID FOR SIMULATING FLUID FLOW IN A WELL SYSTEM ENVIRONMENT

(71) Applicant: Halliburton Energy Services, Inc., Houston, TX (US)

(72) Inventors: Avi Lin, Houston, TX (US); Dinesh Ananda Shetty, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 595 days.

(21) Appl. No.: 14/011,316

(22) Filed: Aug. 27, 2013

(65) Prior Publication Data
US 2015/0066445 A1     Mar. 5, 2015

(51) Int. Cl.
G06F 7/60      (2006.01)
G06F 17/10    (2006.01)
G06F 17/50    (2006.01)

(52) U.S. Cl.
CPC ....... *G06F 17/5009* (2013.01); *G06F 17/5018* (2013.01); *G06F 2217/16* (2013.01)

(58) Field of Classification Search
CPC .............. G06F 17/5009; G06F 17/5018; G06F 2217/16
USPC ............................................................ 703/2
See application file for complete search history.

(56) References Cited

U.S. PATENT DOCUMENTS 6,052,520 A      4/2000  Watts, III
8,515,714 B2 *   8/2013  Witowski ............ G06F 17/5009
                                              703/2

2008/0133186 A1   6/2008  Li et al.
2008/0312880 A1  12/2008  McLuckie
2010/0204972 A1   8/2010  Hsu et al.
2010/0307755 A1  12/2010  Xu et al.
2011/0029291 A1   2/2011  Weng et al.

FOREIGN PATENT DOCUMENTS

WO    WO2012115628    8/2012

OTHER PUBLICATIONS

Khodier et al., "One-Dimensional Adaptive Grid Generation", Internat. J. Math. & Math. Sci., vol. 20, No. 3, 1997, pp. 577-584.
Lassila, "Adaptive Mesh Generation Methods for Path Constrained Optimal Control," 2006, 20 pages.
Russell et al., "Adaptive Mesh Selection Strategies for Solving Boundary Value Problems", SIAM J. Numer. Anal. vol. 15, No. 1, Feb. 1978, pp. 59-80.
Yamaleev, "Minimization of the Truncation Error by Grid Adaptation", NASA/CR-1999-209729, ICASE Report No. 99-46, Nov. 1999, 36 pages.
U.S. Appl. No. 14/011,546, filed Aug. 27, 2013, entitled "Generating a Flow Model Grid Based on Truncation Error Threshold Values," inventors Lin et al.

* cited by examiner

*Primary Examiner* — Saif Alhija
(74) *Attorney, Agent, or Firm* — John W. Wustenberg; Parker Justiss, P.C.

(57) ABSTRACT

In some aspects, a grid-point-spacing ratio is computed for a one-dimensional fluid flow model. The one-dimensional fluid flow model represents a flow path for well system fluid in a subterranean region, and the grid-point-spacing ratio is computed based on a parameter of the flow path. Grid points for the one-dimensional flow model are generated based on the grid-point-spacing ratio.

27 Claims, 6 Drawing Sheets

GENERATING A SMOOTH GRID FOR SIMULATING FLUID FLOW IN A WELL SYSTEM ENVIRONMENT

BACKGROUND

The following description relates to generating grid points for use in fluid flow simulations, for example, in a simulation of well system fluid in a subterranean region.

Flow models have been used to simulate fluid flow in wellbores and other environments. A flow model can use a numerical technique such as a finite difference method for the simulation. A finite difference method can include a distribution of grid points over the simulation domain.

DESCRIPTION OF DRAWINGS

Like reference symbols in the various drawings indicate like elements.

DETAILED DESCRIPTION

Fluid flow models can be used to analyze fluid flow, for example, in a well system environment (e.g., in a wellbore, a fracture network, within the reservoir rock matrix, in a well system tool, etc.) or other environments. In some environments, the fluid flow is unsteady and multi-dimensional (e.g., three-dimensional or at least two-dimensional). In some instances, two- or three-dimensional flow can be described by a one-dimensional flow model, for example, by integrating the governing flow equations over the cross-section of the two- or three-dimensional flow path. In some cases, the resulting equations include nonlinear partial differential equations that can be solved using finite difference, finite volume, or finite element methods. In some cases, the use of one-dimensional flow models can reduce computational costs, and allow for faster or more computationally efficient simulations. In some instances, a flow model can be used to perform numerical simulations in real time, for example, during a fracture treatment or during another well system activity.

In some cases, a fluid flow model models the flow of fluid in a fracture, for example, during a hydraulic fracturing treatment or another type of injection treatment. Hydraulic fracturing can improve the conductivity of a hydrocarbon reservoir, and modeling the hydraulic fracturing treatment can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions associated with some hydraulic fracturing activities. For example, in cases where the fluid pressure in the fractures and the rock deformation are implicitly coupled, the flow models can interact such that the solution of one model affects the other. As another example, some subterranean formations include low-permeability, naturally-fracture rock media, and the flow models can model a discrete or complex fracture network where the induced fractures interact with natural fractures. Other types of environments and conditions can be modeled.

Some numerical techniques represent the computational geometry domain as a sequence of connected points called 'nodes' or 'grid points' or 'a mesh'. The grid points can represent locations in one, two, or three spatial dimensions. In some implementations, a non-uniform mesh of grid points causes the simulations to be more computationally economical. Grid points that are closely separated can give a more detailed or more accurate simulation. However, a computationally efficient technique can have the grid points more closely spaced near points of interest or regions of interest and less closely spaced elsewhere. For example, it may be desirable to cluster grid points around the perforation points on the wellbore to enhance the accuracy of the simulation around the perforation points.

The accuracy and efficiency of the simulation can also depend on the smoothness of the distribution of the grid points. In some cases, a smooth distribution of grid points can have defined higher-order spatial derivatives (second-order, third-order, etc.), which can improve simulation accuracy. For example, a smooth distribution of grid points in a finite difference method can reduce truncation error. In some cases, the grid points can be distributed according to a ratio of spacing between neighboring grid points, for example, as a geometric series.

In some cases, the techniques described here can be used in generating a smooth mesh, for example, that follows a geometric series around points of interest. Parameters of the geometric series can be generated, for example, by finding the root of a polynomial through Newton's method. In some cases, fluid flow simulations (e.g., simulations of convection-diffusion processes, etc.) can adaptively generate optimal or otherwise improved meshes, including meshes that can capture of the features of interest in the simulation.

Figure 1:
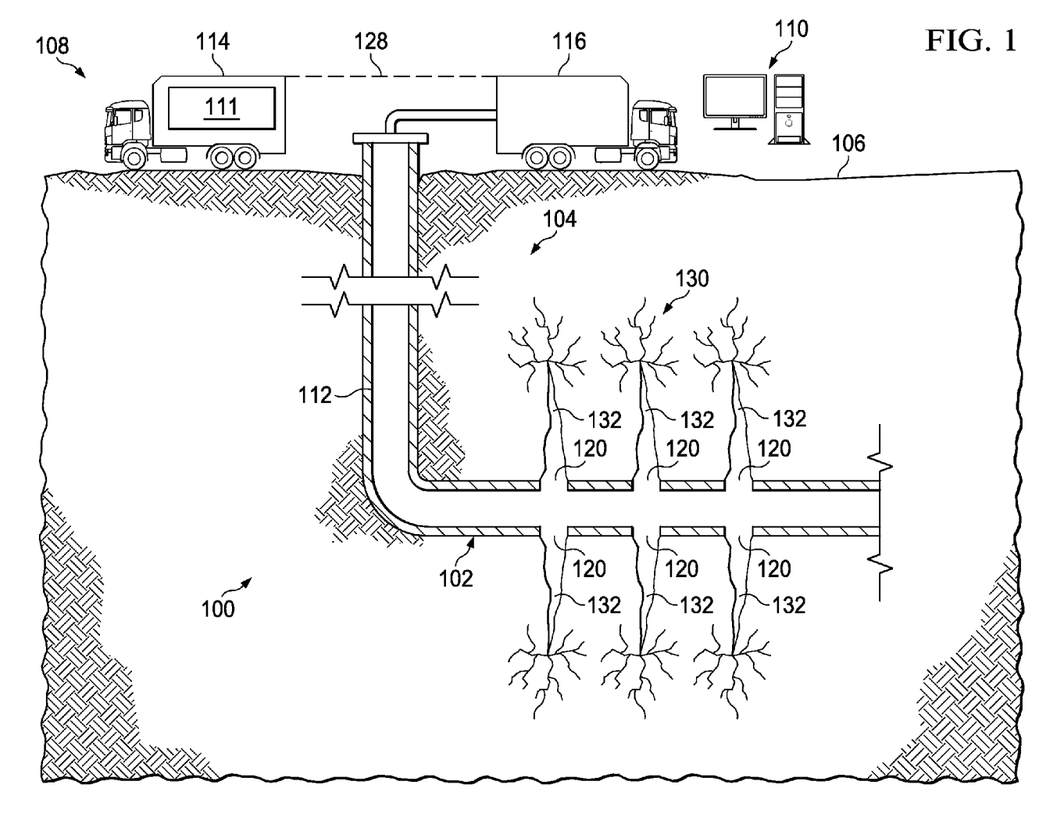
FIG. 1 is a schematic diagram of an example well system.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The example injection system 108 includes instrument trucks 114, pump trucks 116, and an injection treatment control subsystem 111. The example injection system 108 may include other features not shown in the figures. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other suitable structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or a combination thereof.

The injection system 108 may also include surface and down-hole sensors to measure pressure, rate, temperature or other parameters of treatment or production. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The injection system 108 may inject fluid into the formation above, at or below a fracture initiation pressure for the formation; above, at or below a fracture closure pressure for the formation; or at another fluid pressure. Fracture initiation pressure may refer to a minimum fluid injection pressure that can initiate or propagate fractures in the subterranean formation. Fracture closure pressure may refer to a minimum fluid injection pressure that can dilate existing fractures in the subterranean formation. In some instances, the fracture closure pressure is related to the minimum principle stress acting on the formation.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate grid points or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection system.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, or any type of computing or electronic device.

Figure 2:
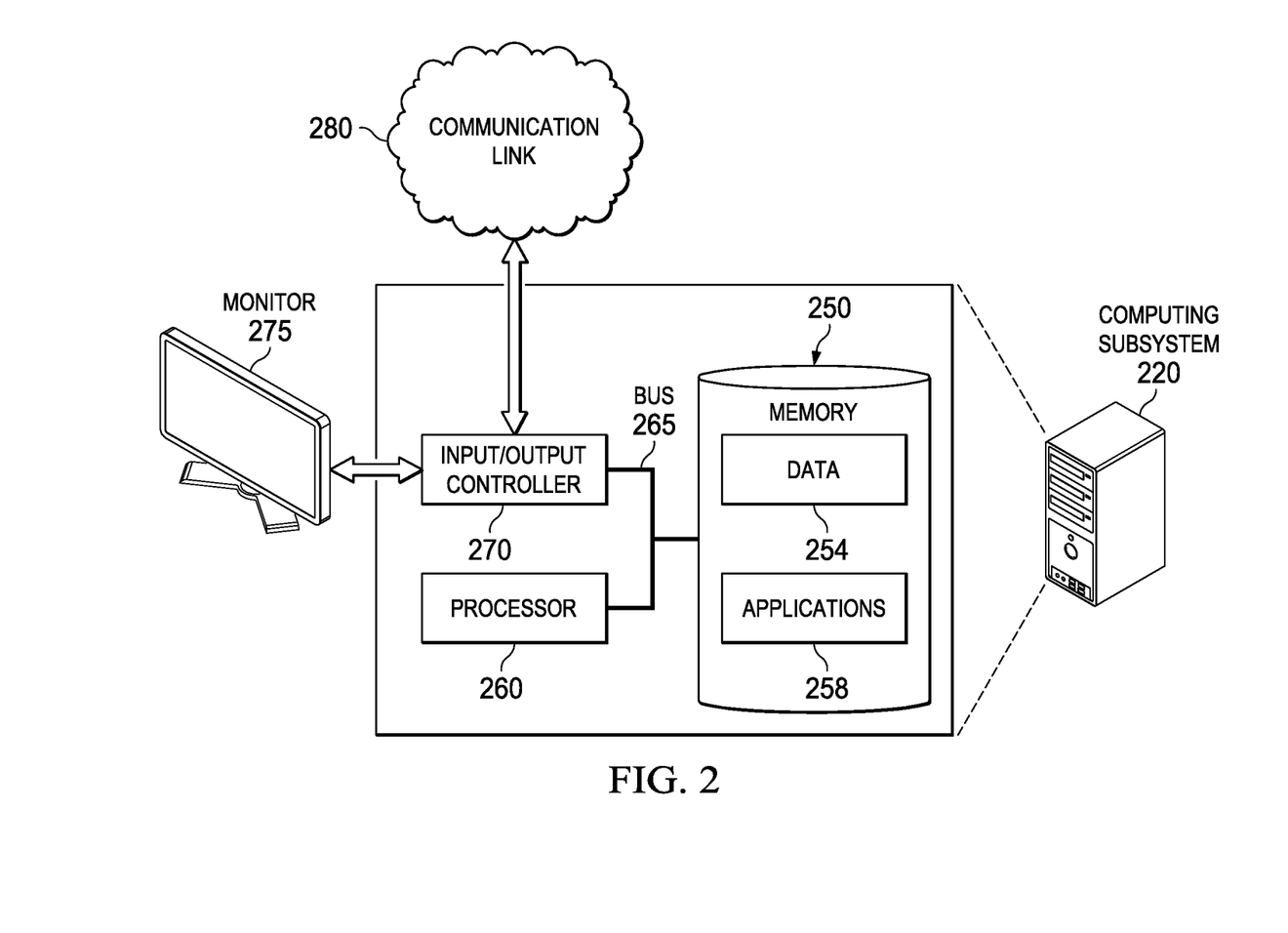
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g., a monitor 275, a mouse, a keyboard, or other input/output devices) and to a communication link 280. The input/output devices can receive or transmit data in analog or digital form over communication links such as a serial link, a wireless link (e.g., infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can also be used to generate grid points. The fluid data can include data related to native fluids that naturally reside in a subterranean region, treatment fluids to be injected into the subterranean region, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-5. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-5. The input data received by the processor 260 or the output data generated by the processor 260 can include any of the treatment data, the geological data, the fracture data, or any other data.

Figure 3:
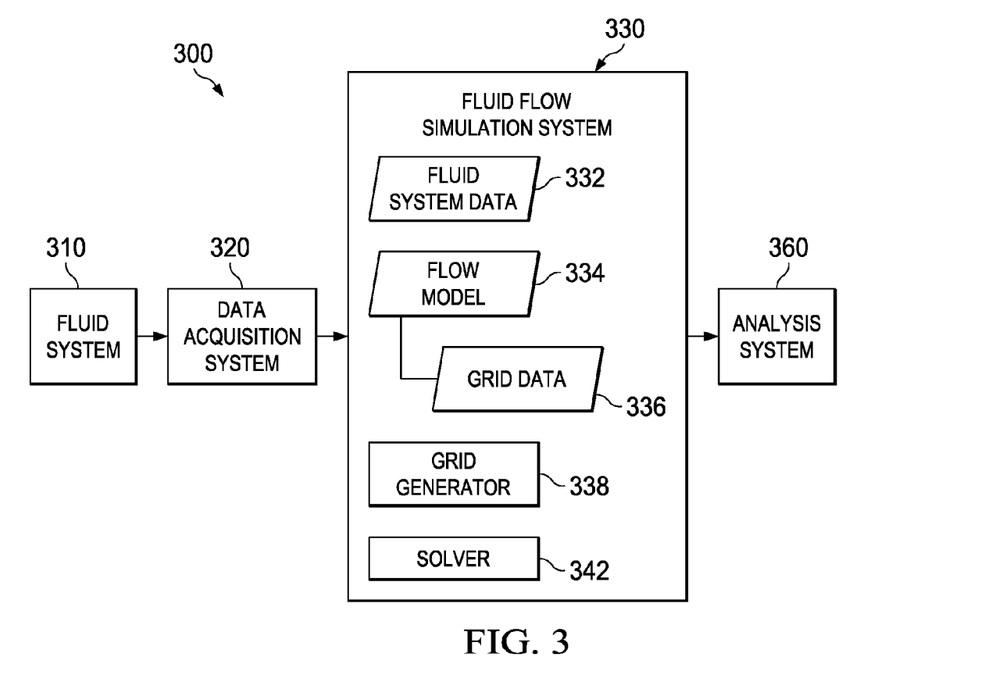
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically-induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems; or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310. In some examples, the data acquisition system 320 obtains fluid pressure data for one or more points on a flow path in the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities or other aspects of fluid flow based on data from the data acquisition system 320 or another source.

The example fluid flow simulation system 330 includes fluid system data 332, flow models 334, and a solver 342. The fluid flow simulation system can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, etc.) of one or more flow paths in the fluid system 310, material properties (e.g., density, viscosity, Reynolds number, etc.) of one or more fluids in the fluid system 310, thermodynamic data (e.g., fluid pressures, fluid temperatures, fluid flow rates, etc.) measured at one or more locations in the fluid system 310, and other types of information.

The fluid system data 332 can include information received from the data acquisition system 320 and other sources.

The flow models 334 can include any information or modules that can be used to simulate fluid flow. The flow models 334 can include governing equations, spatial and temporal discretization data, or other information. In some examples, the flow models 334 include governing flow equations, such as, for example, the Navier-Stokes equation or related approximations of the Navier-Stokes equation, continuity equations, or other types of flow equations. As an example, the flow models 334 may include Equations (1), (3) and (5) below; or the flow models 334 may include additional or different governing flow equations.

The flow models 334 can include spatial discretization data, such as, for example, discrete grid points that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The spatial discretization of the flow paths can be implemented by any suitable algorithm. For example, the system can be discretized according to a finite difference model, a finite volume model, finite element model, or another technique. The system can be discretized in a manner that permits spatial derivatives or partial spatial derivatives to be solved in the discretized spatial domain using numerical methods. In some implementations, the central difference method can be used in the spatial domain. In some implementations, the flow models 334 can include boundary condition data indicating a type of boundary condition to be used in modeling fluid flow.

As shown in FIG. 3, the fluid flow simulation system 330 can also include grid data 336 and a grid generator 338. The grid generator 338 can include any information or modules that can be used to generate grid points for a flow model. For example, the grid generator 338 can generate a distribution of grid points along a flow path based on the length of the flow path, a minimum or maximum grid point spacing, a desired number of grid points, or a combination of these and other factors. In some cases, the grid generator 338 generates the grid points according to the example process 500 shown in FIG. 5, or the grid generator 338 may operate in another manner.

The grid data 336 can be included as part of the flow model 334 or can be based on one or more flow path parameters. All or part of the grid data 336 can be generated by the grid generator 338 or another type of module. The grid data 336 can indicate the grid point locations for a one-dimensional flow model. In some cases, the grid data 336 can include a grid-point-spacing function and function parameters that specify the spacing between adjacent grid points along a flow path represented by a flow model. For example, the grid-point-spacing function can be a geometric series or another function, and the grid data 336 can include a grid-point-spacing ratio or another parameter of the function. In some instances, the distribution of grid points can be smooth and non-uniform, and can be clustered around points of interest.

In some implementations, the fluid flow simulation system 330 can also include a time marching module to perform calculations in a discretized time domain. For example, the governing flow equations may include derivatives or partial derivatives in the time domain, and the time marching module can calculate such quantities based on a time marching algorithm. Example time marching schemes include the backward Euler scheme, the Crank-Nicolson scheme, and others.

The solver 342 can include any information or modules that can be used to solve a system of equations. For example, the solver 342 can be a direct solver or another type of solver. In some implementations, the solver 342 receives inputs from the other components of the fluid flow simulation system 330. For example, the inputs can include the discretized governing flow equations, the grid data 336, the fluid system data 332, or any other information. The inputs can also include data generated or reported from a separate simulation or model. The solver 342 can generate a numerical solution for a variable of interest based on the inputs.

The solution can be generated for some or all of the grid points in a discretized spatial domain. For example, the solver 342 may calculate values of fluid velocity, fluid pressure, or another variable over a spatial domain; the values can be calculated for an individual time step or multiple time steps. In some implementations, the solver 342 obtains a solution by executing the example process 500 shown in FIG. 5, or the solver 342 can obtain a solution using another technique.

The analysis system 360 can include any systems, components, or modules that analyze, process, use, or access the simulation data generated by the fluid flow simulation system 330. For example, the analysis system 360 can be a real time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

Figure 4A:
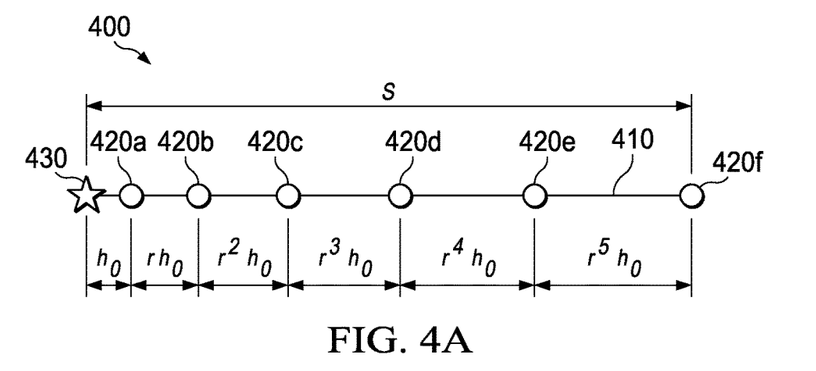
FIG. 4A is a diagram showing an example flow path with grid points.
Figure 4B:
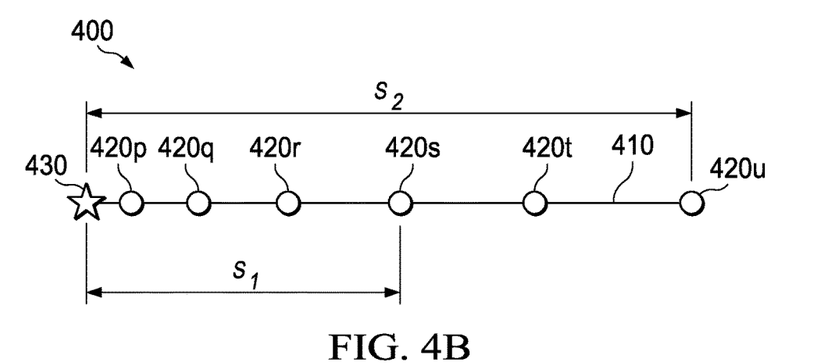
FIG. 4B is a diagram showing an example flow path with grid points.

FIG. 4A and FIG. 4B are diagrams showing aspects of an example fluid flow model 400. The example fluid flow model 400 includes a flow path segment 410, multiple grid points 420*a-f*, and a point of interest 430. The example flow path segment 410 shown in FIG. 4A is a linear flow path, but a flow path can extend through more than one spatial dimension. For example, a flow path can include a curve or multiple intersecting flow paths that extend through two or three spatial dimensions.

The example fluid flow model 400 includes a point of interest 430. The example point of interest 430 represents a distinct location along the flow path segment 410, such as a critical point for the fluid flow model 400. For example, a point of interest can be a location of a perforation in a wellbore. As another example, a point of interest can also represent a location at which flow velocity, direction, or pressure is expected to change significantly in some instances.

The example fluid flow model 400 also includes example grid points 420*a-f*. In some implementations, a flow path in a one-dimensional flow model can include any number of grid points. In some cases, grid points represent locations where fluid flow values (e.g. pressure, flow velocity) are calculated in simulations of the fluid flow model 400. In the example shown in FIG. 4, the grid points 420a-f are distributed non-uniformly along the flow path segment 410. In some instances, grid points can be distributed uniformly along the flow path. In some cases, the grid points are distributed smoothly along the flow path, where some (or all) higher-order derivatives of the distribution are well-defined. In some instances, a point of interest (e.g. point of interest 430) can be a grid point.

A curve representing a flow path (e.g. example flow path segment 410) can be mapped onto a straight line using arc-length preserving mapping. The curve can have a one-dimensional, two-dimensional, or three-dimensional geometry. In some instances, the curve can be described by a series of trajectory points. For example, the curve can be described by a set of q triplets $(x_i, y_i, z_i)$, each representing a trajectory point in the 3D Cartesian coordinate (x, y, z) space. In some instances, the geometry of the curve can be considered a collection of straight line segments between each respective trajectory point. The arc-length representation of a curve composed of straight line segments can be expressed by:

$$s_1 = 0; s_j = \sum_{i=2}^{j} \sqrt{(x_i - x_{i-1})^2 + (y_i - y_{i-1})^2 + (z_i - z_{i-1})^2}, \quad (1)$$

In Equation (1), $s_j$ is an approximation of the total arc-length of the first j trajectory points $(x_i, y_i, z_i)$ on the curve. Equation (1) can provide an adequate approximate for the length of a flow path, in some instances. For example, if the entire curve is described by q trajectory points, then the arc-length of the curve can be given by $s_q$. The arc-length of the curve can be designated S, as shown in FIG. 4A.

The curve can be represented in the computational domain by a sequence of grid points at locations along the curve. The computational domain can be discretized using the finite collection of grid points. In some instances, the collection of grid points can have a minimum grid-point-spacing distance $h_0$. In some flow models, all flow paths (or flow paths segments) have a minimum grid-point-spacing distance $h_0$. The minimum grid-point-spacing distance (or "grid distance") $h_0$ can be specified by a user or derived from an algorithm. For example, the minimum grid-point-spacing distance $h_0$ could be based on conditions (e.g., a Courant-Friedrichs-Lewy (CFL) condition, etc.) derived from the stability of the numerical algorithm applied on the current mesh for a convection-diffusion equation.

In some instances, the grid point spacings can be defined based on a ratio of distances between grid points. For example, in some cases, any three grid points on a flow path can define a ratio of grid point spacing values, and a grid-point-spacing ratio can be computed for any three or more adjacent or non-adjacent grid points. The grid-point-spacing ratio for successive or non-successive grid points can be a fixed value, a pre-determined value, a value generated from an algorithm, or another type of value. The grid-point-spacing ratio can describe a non-uniform grid. For example, the spacing of the grid points can follow a geometric series with a grid-point-spacing ratio r between any two successive spacings. The ratio r can be greater than 1 or less than 1. For example, FIG. 4A shows example grid points 420a-f spaced described by a geometric series with ratio r>1.

In this example, the distance from point of interest 430 to grid point 420a is the minimum grid-point-spacing distance $h_0$. The next more distant grid point spacing is equal to the ratio r times the minimum grid-point-spacing distance $h_0$. For grid points more distant from the point of interest 430, each grid spacing is equal to the ratio r times a neighboring grid spacing. In this example, the distance between each pair of adjacent grid points is equal to the ratio r multiplied by a distance between one of the two adjacent grid points and another grid point. For instance, as shown in FIG. 4A, the distance ($r^2 h_0$) between grid points 420b and 420c is equal to the ratio r multiplied by the distance ($rh_0$) between the adjoining pair of grid points 420a and 420b.

A collection of (n+1) grid points spaced along a curve with geometric ratio r>1 can be described by the polynomial equation $$1 + r + r^2 + \ldots + r^{n-1} + r^n = K. \quad (2)$$

Equation (2) is a polynomial equation of order n. In some instances, the quantity K can be defined as:

$$K = \frac{S}{h_0}. \quad (3)$$

In Equation (3), S represents the total arc-length of the curve to be meshed, and $h_0$ represents the minimum grid space. The value of S can be determined from an arc-length equation such as Equation (1). The minimum grid-point-spacing distance $h_0$ is a value that can represent the smallest grid point spacing. For example, the minimum grid-point-spacing distance can be based on computational constraints, physical parameters of the flow path, or other information. In some cases, a global minimum grid-point-spacing distance can be used. For example, the global minimum grid-point-spacing distance can specify a minimum value for all flow paths or all flow path segments in a flow model. In some cases, the minimum grid-point-spacing distance for a particular flow path, flow path segment, or subset of nodes can be used.

A value of the grid-point-spacing ratio r can be determined based on parameters of a flow path. For example, the grid-point-spacing ratio r can be computed based on the number of grid points (n+1), the arc-length of the flow path S, the minimum grid point spacing distance $h_0$, or a combination of these and other values. The grid-point-spacing ratio r can represent a geometric ratio that can be used to generate (n+1) grid points with geometrically-ratioed spacings that are distributed along the curve of arc-length S, with the smallest spacing being $h_0$. The grid-point-spacing ratio r can be used as a grid clustering parameter.

The ratio r can be obtained by solving for the root of the polynomial in Equation (2). The Equation (2) can be solved using a numerical technique or algorithm such as an iterative technique. For example, the iterative Newton's method technique can be used to solve the polynomial. Equation (2) can be rewritten in the form $$F(r) = \frac{r^{n+1} - 1}{r - 1} - K = 0. \quad (4)$$

The iterative update statement for each iteration index m can be described as:

$$r_{m+1} = r_m - c_m \quad (5)$$

where $$c_m = \frac{F(r_m)}{F'(r_m)}. \quad (6)$$

The polynomial in Equation (2) can have only one positive real root (for odd order n), or the polynomial in Equation (2) can have two real roots where one is positive and the other one is negative (for even order n). In either case, the remaining roots are complex conjugate pairs. For mesh generation, the positive root can be identified by a numerical technique. In some cases, an iterative root-finding algorithm (e.g., Newton's method) can be configured to always converge to the positive root.

For example, assume that the starting guess $r_0$ is taken as a positive value. For the case where r is very close to 1 the following holds:

$$\lim_{r \to 1} c = \frac{2(n+1-K)}{n(n+1)}. \quad (7)$$

For example, similar analysis holds for the cases where the roots are away from 1, by defining $x_m = r_m - 1$, and therefore $$c_m = \frac{x_m[(1-x_m)^{n+1} - 1 - Kx_m]}{x_m(n+1)(1+x_m)^n - ((1+x_m)^{n+1} - 1)}. \quad (8)$$

For example, the binomial series $$(1+x)^n = 1 + nx + n(n-1)\frac{x^2}{2!} + \ldots \quad (9)$$

implies the inequality $$\frac{[(1+x_m)^{n+1} - 1 - Kx_m]}{x_m(n+1)(1+x_m)^n - ((1-x_m)^{n+1} - 1)} < 1. \quad (10)$$

Equation (10) implies that $c_m < x_m$, and the root is determined to be positive.

After the locations of the grid points on the arc-length representation are obtained, they can be transformed back to the original curve geometry using the relations:

$$\frac{x - x_1}{x_2 - x_1} = \frac{y - y_1}{y_2 - y_1} = \frac{z - z_1}{z_2 - z_1} \quad (11)$$

and $$s_j = \sum_{k=2}^{j} \sqrt{(x_k - x_{k-1})^2 + (y_k - y_{k-1})^2 + (z_k - z_{k-1})^2}. \quad (12)$$

In some cases, this technique can provide a clustering of grid points that covers the entire computational domain with discrete points, without discontinuities.

FIG. 4B shows a diagram of the example fluid flow model 400, with the flow path segment 410 discretized based on two sub-lengths $S_1$ and $S_2$. The first sublength $S_1$ includes the point of interest 430 and grid points 420p-s; the second sublength $S_2$ includes the first sub-length $S_1$ and additional grid points 420t-u. In some instances, the number of grid points within a given arc-length of a critical point can be specified as an input or a constraint. For example, a simulation of turbulent boundary layers can use a higher resolution mesh for sub-layers within the boundary layer. In the example shown in FIG. 4B, m grid points are calculated within the sub-length $S_1$ of the critical point 430, and n grid points are calculated within the sub-length $S_2$. In some implementations, a grid-point-spacing ratio r can be determined for the overall arc-length $S_2$ with n grid points and the sub-length $S_1$ with m grid points such that $S_2 < S_1$ and $m < n$. In some cases, given values of $S_1$, $S_2$, n, and m, a grid-point-spacing ratio r can be described by $$\frac{1 + r + r^2 + \ldots + r^{n-1} + r^n}{1 + r + r^2 + \ldots + r^{m-1} + r^m} = K \quad (13)$$

with $$K = \frac{S_1}{S_2}. \quad (14)$$

In some examples, a minimization function can be given by $$F(r) = \frac{r(r^n - Kr^m) + K - 1}{r - 1} = 0. \quad (15)$$

The minimization function can be used in an iterative root-finding algorithm, and an update statement for each iteration index k can appear as:

$$r_{k+1} = r_k - c_k \quad (16)$$

with $c_k$ as in Equation (8). These example equations can obtain the positive roots of the minimization function.

For example, the starting guess $r_0$ can be taken to be a positive value. If r is very close to 1 then $$\lim_{r \to 1} c = \frac{2(n+1 - K(m+1))}{n(n+1) - Km(m+1)}. \quad (17)$$

From Equation (14), it can be determined that $$K > \frac{n+1}{m+1}. \quad (18)$$

In such instances, the correction c remains negative, which can ensure positivity of the root. Similar analysis can be done for cases where the root is not close to 1.

The example grid point generation techniques described here can incorporate or be based on one or more flow path parameters. Example flow path parameters include the length of the flow path segment, the location of a point of interest, locations of an endpoint of the flow path segment, or other parameters. In some cases, the grid-point-spacing ratio r can be computed from the length of the flow path and the number of grid points n; or the grid-point-spacing ratio r can be computed from the length of the flow path and the minimum grid-point-spacing distance $h_0$. In some implementations, the minimum grid-point-spacing distance $h_0$ can determine characteristics of the mesh. Additional or different inputs may be used. In some cases, the grid-point-spacing ratio r the number of grid points n can be used to estimate a minimum grid-point-spacing distance $h_0$; or the grid-point-spacing ratio r and a minimum grid-point-spacing distance $h_0$ can be used to calculate the number of grid points n. In some implementations, the minimum grid-point-spacing distance $h_0$ can determine characteristics of the mesh. For example, if $h_0=S/n$, then a uniform mesh can be generated in some instances; if $h_0<S/n$ then grid points can be clustered towards the points of interest and if $h_0>S/n$ grid points can be stretched away from the points of interest.

The example algorithms presented here can provide a technique for generating a smooth distribution of grid points around a point of interest. In some examples, the grid point are distributed according to a geometric series, and higher-order spatial derivatives can be well-defined. The example algorithms presented here can also be applied to two-dimensional grids or three-dimensional grids, such as those used with finite volume or finite element methods.

In some implementations, the example algorithms presented here do not require the location of the points of interest known a priori. The point of interest can be determined during the simulation from the grid-based solution. For example, a point of interest can be based on the gradient or the curvature of the solution. A single flow path can have multiple points of interest, each with a separate collection of clustered grid points determined by the algorithm. A transition point between multiple collections can be specified or calculated. For example, the midpoint between two points of interest can be designated a transition point for the collection of grid points associated with each point of interest.

In some cases, separate collections of grid points can have different grid-point-spacing ratios. For example, a first point of interest can have an associated collection of grid points spaced with grid-point-spacing ratio $r_1$, and an adjacent second point of interest can have an associated collection of grid points spaced with grid-point-spacing $r_2$, where $r_1 \neq r_2$. In cases where multiple grid-point-spacing ratios are computed, a single minimum grid-point-spacing distance $h_0$ can be used, multiple distinct minimum grid-point-spacing distances $h_{0i}$ can be used, or the ratios can be specified or calculated for each collection based on combinations of these and other parameters.

Figure 5:
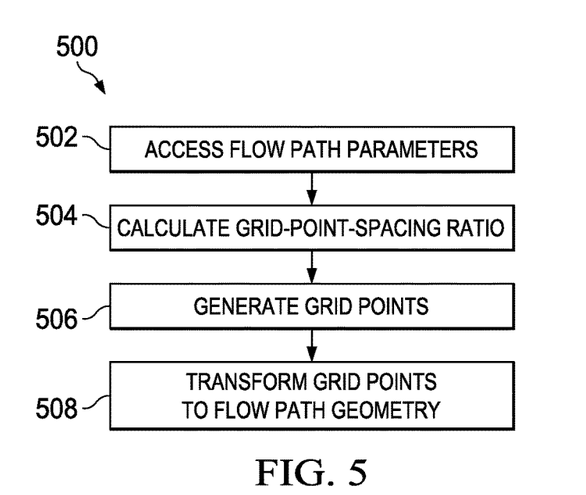
FIG. 5 is a flow chart showing an example technique for generating grid points.

FIG. 5 is a flow chart showing an example process 500 for generating grid points. All or part of the example process 500 may be computer-implemented, for example, using the features and attributes of the example computing system 200 shown in FIG. 2 or other computing systems. The process 500, individual operations of the process 500, or groups of operations may be iterated or performed in parallel, in series, or in another manner. In some cases, the process 500 may include the same, additional, fewer, or different operations performed in the same or a different order.

The example process 500 can be used to generate grid points for modeling a variety of physical systems. In some implementations, the process 500 is used to generate grid points for modeling a fluid injection or production system (e.g., in a wellbore, in a flow control device or flow conduit installed in a wellbore, etc.), within a subterranean formation (e.g., from a wellbore into reservoir media, through a rock matrix in the reservoir media, through fractures or discontinuities in the reservoir media, etc.), or combinations thereof. The process 500 may also be used to generate grid points for modeling other environments, for example, outside the context of a well system.

At 502, one or more flow path parameters are accessed. The flow path parameters can include any information that characterizes a flow path or a flow path segment. Example flow path parameters include the length of the flow path or flow path segments, the locations of one or more points of interest, the locations of one or more flow path endpoints, the locations of one or more flow path intersections, a minimum grid-point-spacing distance, a number of grid points to be generated, a number of grid points to be generated within a certain length of flow path segment, or some other parameter.

At 504, the grid-point-spacing ratio is calculated. The grid-point-spacing ratio can be based on one or more flow path parameters. In some cases, the grid-point-spacing ratio is associated with a geometric series ratio. In some instances, the grid-point-spacing ratio is calculated by finding a root of a polynomial, such as that in Equation (2). The grid-point-spacing ratio can be calculated using a numerical method or algorithm. For example, the grid-point-spacing ratio can be calculated by using an iterative Newton's method. The grid-point-spacing ratio can be calculated to satisfy a smoothness criterion.

At 506, grid points are generated. The grid points can describe locations along the arc-length representation of a flow path or flow path segment. The grid points can be generated by an algorithm or function, and can be based on the grid-point-spacing ratio. In some examples, the grid points are generated based on the grid-point-spacing ratio r and the minimum grid-point-spacing distance $h_0$ according to a geometric series, as shown, for example, in FIG. 4A. The grid points can be further adjusted or modified. In some cases, the grid points are generated according to another type of grid-point-spacing function.

At 508, the grid points are transformed to the flow path geometry. For example, the generated grid points can be transformed to the two- or three-dimensional physical domain of a curved or branched flow path. In some instances, the locations of the grid points along the arc-length representation of the flow path can be transformed to locations on the flow path based on Equations (11) and (12), or based on another technique. The grid points can be communicated to a separate model or simulation, or used with a separate flow path or domain.

Figure 6:
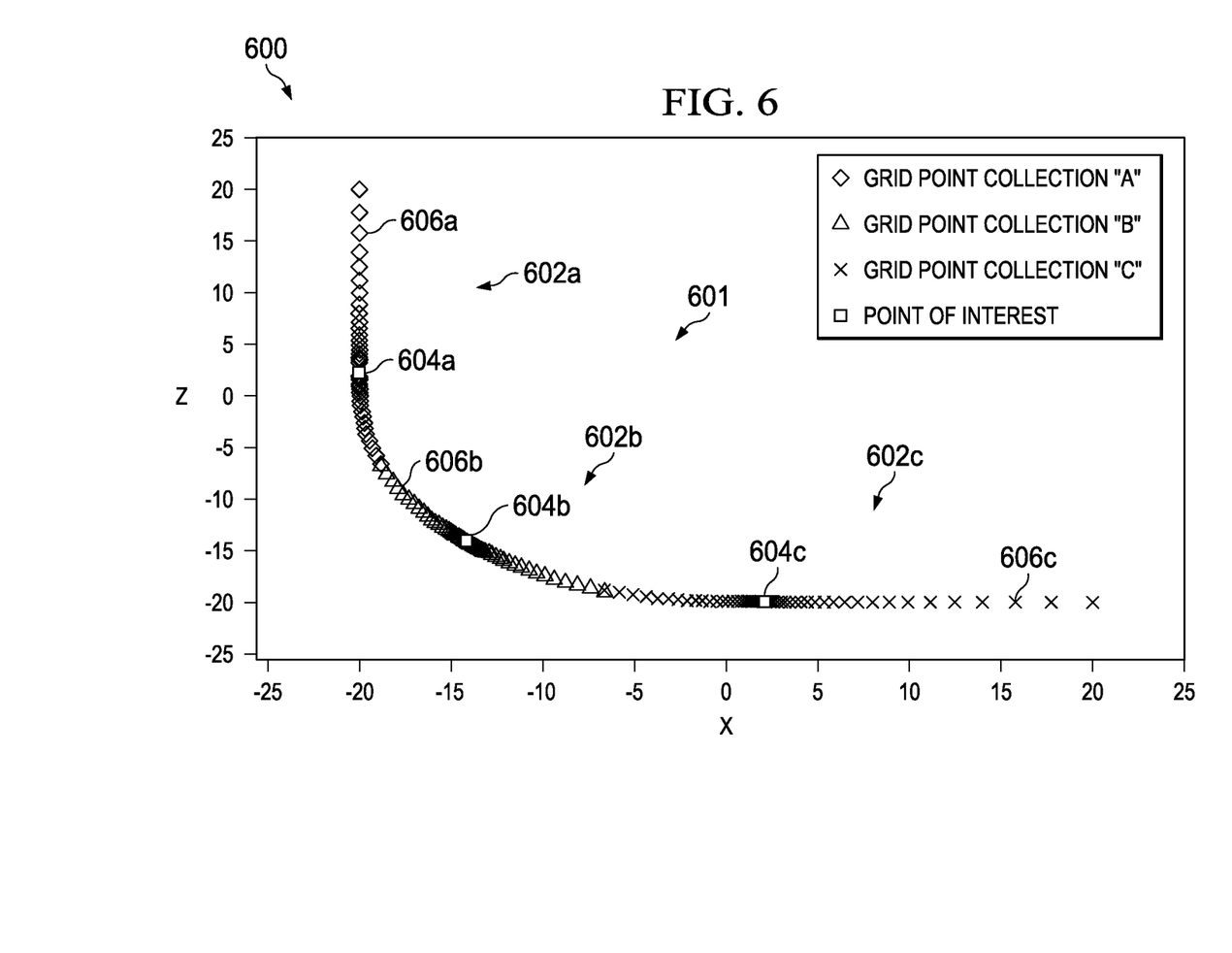
FIG. 6 is a two-dimensional plot showing example grid points for a one-dimensional flow model.

FIG. 6 is a plot 600 showing grid points computed for an example flow path 601, using the techniques described above (e.g., with respect to FIGS. 4A, 4B, and 5). The plot 600 shows the location of each grid point generated for a one-dimensional model representation of the flow path 601. The example flow path 601 shown in FIG. 6 extends through two spatial dimensions, which are represented by the z-axis and x-axis in the plot 600. The flow path 601 can represent, for example, a curved wellbore in a subterranean region, and the points of interest 604a, 604b, and 604c can represent perforations along the length of the wellbore.

FIG. 6 shows three collections of grid points, which are labeled collection A, collection B, and collection C in the plot 600. Each collection of grid points is generated for a different segment of the flow path 601. Grid point collection A (including example grid point 606a) are clustered about a first point of interest 604a in a first flow path segment 602a; grid point collection B (including example grid point 606b) are clustered about a second point of interest 604b in a second flow path segment 602b; grid point collection C (including example grid point 606c) are clustered about a third point of interest 604c in a third flow path segment 602c.

In the example shown in FIG. 6, the grid points are spaced according to a geometric series in both direction from each point of interest. Grid point collection A are clustered about point of interest 604a; from the point of interest 604a, the grid-point spacings increase toward the positive z-direction, and toward the negative z-direction, according to a geometric series. The geometric series spacing can provide a smooth and continuous coverage of each flow path segment.

Figure 7:
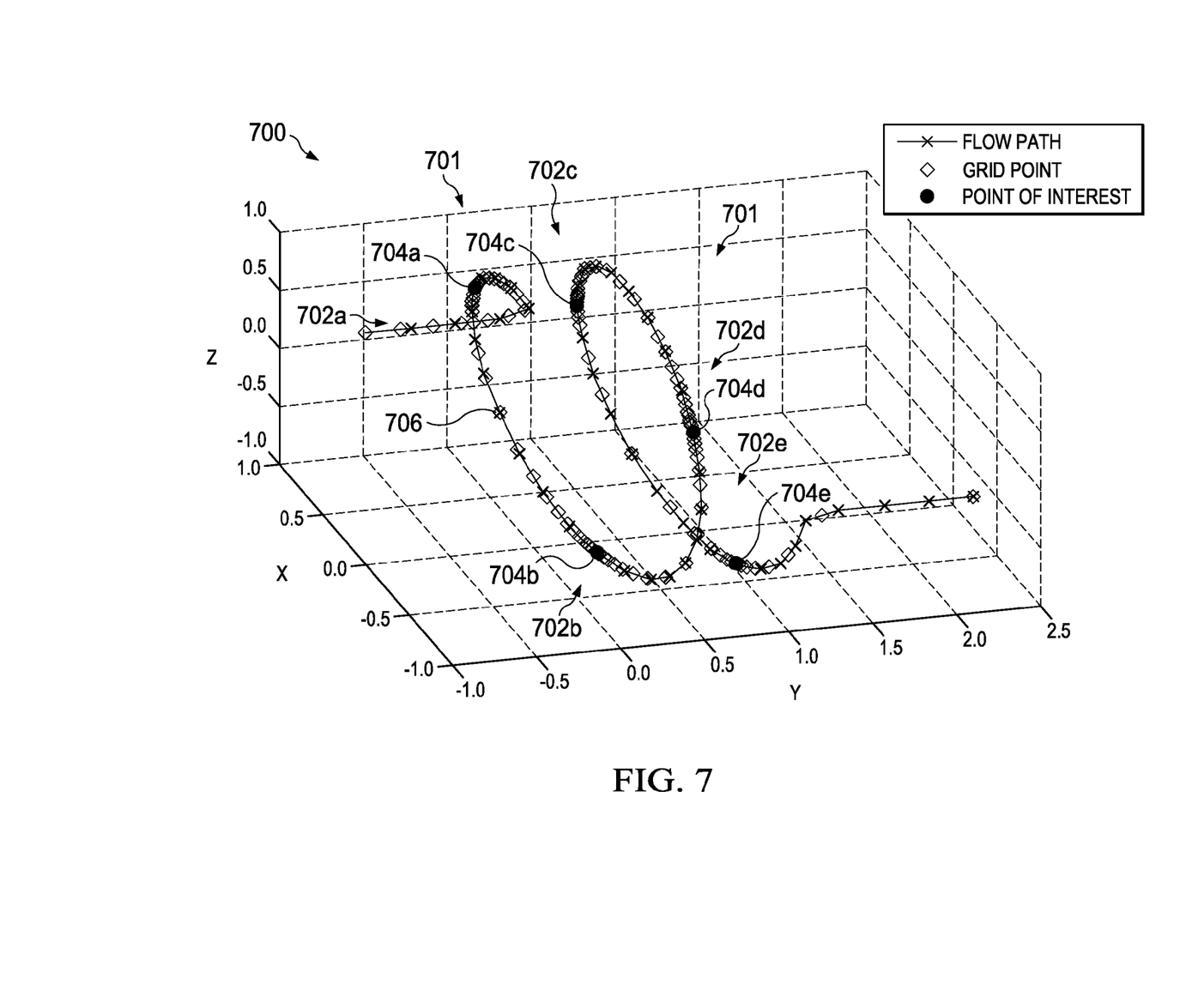
FIG. 7 is a three-dimensional plot showing example grid points for a one-dimensional flow model.

FIG. 7 is a plot 700 showing grid points computed for an example flow path 701, using the techniques described above (e.g., with respect to FIGS. 4A, 4B, and 5). The plot 700 shows the location of each grid point generated for a one-dimensional model representation of the flow path 701. The example flow path 701 shown in FIG. 7 extends through three spatial dimensions, which are represented by the z-axis, the y-axis, and the x-axis in the plot 700.

FIG. 7 shows five collections of grid points; an example grid point 706 is labeled in the plot 700. Each collection of grid points is generated for a different segment of the flow path 701. The grid points along each flow path segment 702a, 702b, 702c, 702d, and 702e are clustered about a respective point of interest 704a, 704b, 704c, 704d, and 704e in the flow path segment. In the example shown in FIG. 7, the grid points are spaced according to a geometric series in both direction from each point of interest.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system can be or include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A fluid flow modeling method comprising:
computing, by operation of one or more computers, a grid-point-spacing ratio for a one-dimensional flow model, the one-dimensional flow model representing a flow path in a higher-than-one dimensional physical domain for well system fluid in a subterranean region, the grid-point-spacing ratio being computed based on a parameter of the flow path, the one-dimensional flow model including a finite sequence of grid points that discretize a computational domain; and
generating the grid points for the one-dimensional flow model based on the grid-point-spacing ratio, the grid points representing a sequence of respective locations along the flow path in the higher-than-one dimensional physical domain based on arc-length preserving mapping which maps a curve representing the flow path into a straight line, the curve described by a series of trajectory points.

2. The method of claim 1, comprising computing the grid-point-spacing ratio based on:
a length of a one-dimensional flow path segment; and
a minimum grid-point-spacing distance.

3. The method of claim 1, comprising computing the grid-point-spacing ratio based on:
a length of a one-dimensional flow path segment; and
a number of grid points to be generated on the flow path segment.

4. The method of claim 1, comprising computing the grid-point-spacing ratio according to an iterative root-finding algorithm.

5. The method of claim 4, wherein the algorithm is configured to converge on a positive real value.

6. The method of claim 4, wherein the algorithm is configured to converge on a positive real root of a function that has only one positive real root.

7. The method of claim 1, comprising generating grid points for the one-dimensional flow model according to a grid-point-spacing function that satisfies a smoothness criterion.

8. The method of claim 7, comprising generating n+1 grid points for the one-dimensional flow model according to the grid-point-spacing function, where a (n+1)-order spatial derivative of the grid-point-spacing function exists.

9. The method of claim, comprising generating n+1 grid points for the one-dimensional flow model according to the grid-point-spacing function, where all orders of spatial derivatives of the grid-point-spacing function exist.

10. The method of claim 1, wherein a distance between each pair of adjacent grid points is equal to the grid-point-spacing ratio multiplied by a distance between one of the adjacent grid points and another grid point.

11. The method of claim 1, wherein the grid points are spaced along a flow path segment according to a geometric series, and the geometric series is defined based on a length of the flow path and the grid-point-spacing ratio.

12. The method of claim 1, comprising calculating spatial coordinates of the grid points in a three-dimensional physical domain.

13. The method of claim 1, comprising computing a first grid-point-spacing ratio for a first segment of the flow path and a second grid-point spacing ration for a second segment of the flow path.

14. The method of claim 13, comprising:
calculating the first grid-point-spacing ratio based on a length of the first segment and a number of grid points for the first segment; and
calculating the second grid-point-spacing ratio based on a length of the second segment and a number of grid points for the second segment.

15. A non-transitory computer-readable medium storing instructions that, when executed by data processing apparatus, perform operations comprising:
accessing a parameter of a flow path in a higher-than-one dimensional physical domain in a subterranean region, the flow path represented by a one-dimensional flow model for well system fluid in the subterranean region, the one-dimensional flow model including a finite sequence of grid points that discretize a computational domain;
computing a grid-point-spacing ratio for the one-dimensional flow model based on the parameter of the flow path; and
generating grid points for the one-dimensional flow model based on the grid-point-spacing ratio, the grid points representing a sequence of respective locations along the flow path in the higher-than-one dimensional physical domain based on arc-length preserving mapping which maps a curve representing the flow path into a straight line, the curve described by a series of trajectory points.

16. The computer-readable medium of claim 15, wherein the grid-point-spacing ratio is computed based on:
a length of a one-dimensional flow path segment; and
at least one of:
a global minimum grid-point-spacing distance for the one-dimensional flow model; or
a number of grid points to be generated on the flow path segment.

17. The computer-readable medium of claim 15, wherein the grid-point-spacing ratio is computed according to an iterative root-finding algorithm that is configured to converge on a positive real value.

18. The computer-readable medium of claim 15, wherein the grid points are generated according to a grid-point-spacing function that satisfies a smoothness criterion.

19. The computer-readable medium of claim 15, wherein a distance between each pair of adjacent grid points is equal to the grid-point-spacing ratio multiplied by a distance between one of the adjacent grid points and another grid point.

20. The computer-readable medium of claim 15, wherein the grid points are spaced along a flow path segment according to a geometric series, and the geometric series is defined based on a length of the flow path and the grid-point-spacing ratio.

21. The computer-readable medium of claim 15, wherein the grid-point-spacing ratio r is computed to such that:

$$1 + r + r^2 + \ldots + r^{n-1} + r^n = \frac{S}{h_0}$$

where n+1 is a number of grid points generated, S is an arc-length of the flow path, and $h_0$ is a minimum grid-point-spacing distance.

22. The computer-readable medium of claim 15, the operations comprising computing a first grid-point-spacing ratio for a first segment of the flow path and a second grid-point spacing ration for a second segment of the flow path.

23. A fluid flow modeling system comprising one or more computers that include:
   flow model data associated with a one-dimensional flow model for well system fluid, the flow model data including a parameter of a flow path in a higher-than-one dimensional physical domain, the flow path represented by the one-dimensional flow model, the one-dimensional flow model including a finite sequence of grid points that discretize a computational domain; and
   a grid-generation module operable to:
      compute a grid-point-spacing ratio for the one-dimensional flow model based on the parameter of the flow path; and
      generate the grid points for the one-dimensional flow model based on the grid-point-spacing ratio, the grid points representing a sequence of respective locations along the flow path in the higher-than-one dimensional physical domain based on arc-length preserving mapping which maps a curve representing the flow path into a straight line, the curve described by a series of trajectory points.

24. The fluid flow modeling system of claim 23, wherein the grid-generation module is operable to compute the grid-point-spacing ratio based on:
   a length of a one-dimensional flow path segment; and
   at least one of:
      a global minimum grid-point-spacing distance for the one-dimensional flow model; or
      a number of grid points to be generated on the flow path segment.

25. The fluid flow modeling system of claim 23, wherein the grid-generation module is operable to compute the grid-point-spacing ratio according to an iterative root-finding algorithm.

26. The fluid flow modeling system of claim 23, wherein a distance between each pair of adjacent grid points is equal to the grid-point-spacing ratio multiplied by a distance between one of the adjacent grid points and another grid point.

27. The method of claim 1, further comprising transforming the grid points of the one-dimensional flow model to a geometric representation of the flow path in the higher-than-one dimensional physical domain.

* * * * *

UNITED STATES PATENT AND TRADEMARK OFFICE
CERTIFICATE OF CORRECTION

PATENT NO. : 9,576,084 B2
APPLICATION NO. : 14/011316
DATED : February 21, 2017
INVENTOR(S) : Avi Lin and Dinesh Ananda Shetty It is certified that error appears in the above-identified patent and that said Letters Patent is hereby corrected as shown below:

In the Claims

In Column 19, Line 60, after "The method of claim" please insert --7--

Signed and Sealed this
Second Day of October, 2018

Andrei Iancu
*Director of the United States Patent and Trademark Office*